United States Patent
Jang et al.

(10) Patent No.: US 12,418,483 B1
(45) Date of Patent: Sep. 16, 2025

(54) PREFIX SUMMARIZATION SCALE BY DEDUPLICATING LONGEST PREFIX MATCH (LPM) SUB-TRIES

(71) Applicant: Arista Networks, Inc., Santa Clara, CA (US)

(72) Inventors: Chen Jia Jang, Burnaby (CA); Ganesan Venkataraman, Sunnyvale, CA (US); Ramakrishna Paduvalli, Saratoga, CA (US); Muhammad Khalid Yousuf, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 18/604,234

(22) Filed: Mar. 13, 2024

(51) Int. Cl.
*H04L 45/748* (2022.01)
*H04L 45/7453* (2022.01)
*H04L 45/76* (2022.01)

(52) U.S. Cl.
CPC ........ *H04L 45/748* (2013.01); *H04L 45/7453* (2013.01); *H04L 45/76* (2022.05)

(58) Field of Classification Search
CPC .... H04L 45/748; H04L 45/76; H04L 45/7453
See application file for complete search history.

(56) References Cited

U.S. PATENT DOCUMENTS

| | | | | |
|---|---|---|---|---|
| 7,089,240 | B2 * | 8/2006 | Basso | H04L 12/66 707/999.005 |
| 9,647,941 | B2 * | 5/2017 | Sun | H04L 45/748 |
| 9,979,651 | B2 * | 5/2018 | Labonte | H04L 47/17 |
| 10,230,639 | B1 * | 3/2019 | Patil | G06F 16/2246 |
| 10,511,532 | B2 * | 12/2019 | Wang | H04L 45/488 |
| 2003/0023581 | A1 * | 1/2003 | Davis | H04L 45/04 |
| 2013/0031077 | A1 * | 1/2013 | Liu | G06F 7/02 707/706 |

* cited by examiner

*Primary Examiner* — G. C. Neurauter, Jr.
(74) *Attorney, Agent, or Firm* — Fountainhead Law Group, PC (57) ABSTRACT

Techniques for improving the prefix summarization scale of the longest prefix match (LPM) tables of a network device are provided. In one set of embodiments, these techniques involve deduplicating sub-tries of LPM trie data structures that the network device uses to program LPM entries into the LPM tables. This sub-trie deduplication avoids the creation of duplicate LPM entries in the LPM tables across different virtual routing and forwarding (VRF) instances, thereby increasing the LPM tables' effective capacity.

20 Claims, 5 Drawing Sheets

PREFIX SUMMARIZATION SCALE BY DEDUPLICATING LONGEST PREFIX MATCH (LPM) SUB-TRIES

BACKGROUND

Prefix summarization is a feature used by network devices to reduce the number of ternary content-addressable memory (TCAM) entries needed for implementing access control lists (ACLs) and other network traffic control functions. In the context of ACLs, prefix summarization generally involves identifying a set S of Internet Protocol (IP) prefixes that are associated with the same ACL action A, creating mappings that map each IP prefix in set S to a common label L, and programming the mappings into one or more longest prefix match (LPM) tables of the network device. Because all of the IP prefixes in set S (which are associated with the same action A) are summarized via label L, the network device's TCAM only needs to store a single TCAM entry that maps label L to action A for set S, rather than multiple TCAM entries that map each IP prefix in set S to action A.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and details are set forth in order to provide an understanding of embodiments of the present disclosure. Particular embodiments as expressed in the claims may include some or all of the features in these examples, alone or in combination with other features described below, and may further include modifications and equivalents of the features and concepts described herein.

The present disclosure describes techniques for improving the prefix summarization scale of the LPM tables of a network device, or in other words more efficiently utilizing the capacity of those tables for storing table entries (referred to as LPM entries) corresponding to prefix-to-label mappings.

In one set of embodiments, these techniques involve deduplicating sub-tries of LPM trie data structures that the network device uses to program the LPM entries into the LPM tables. This sub-trie deduplication avoids the creation of duplicate LPM entries in the LPM tables across different virtual routing and forwarding (VRF) instances, thereby increasing the LPM tables' effective capacity.

1. Example Network Device

Figure 1:
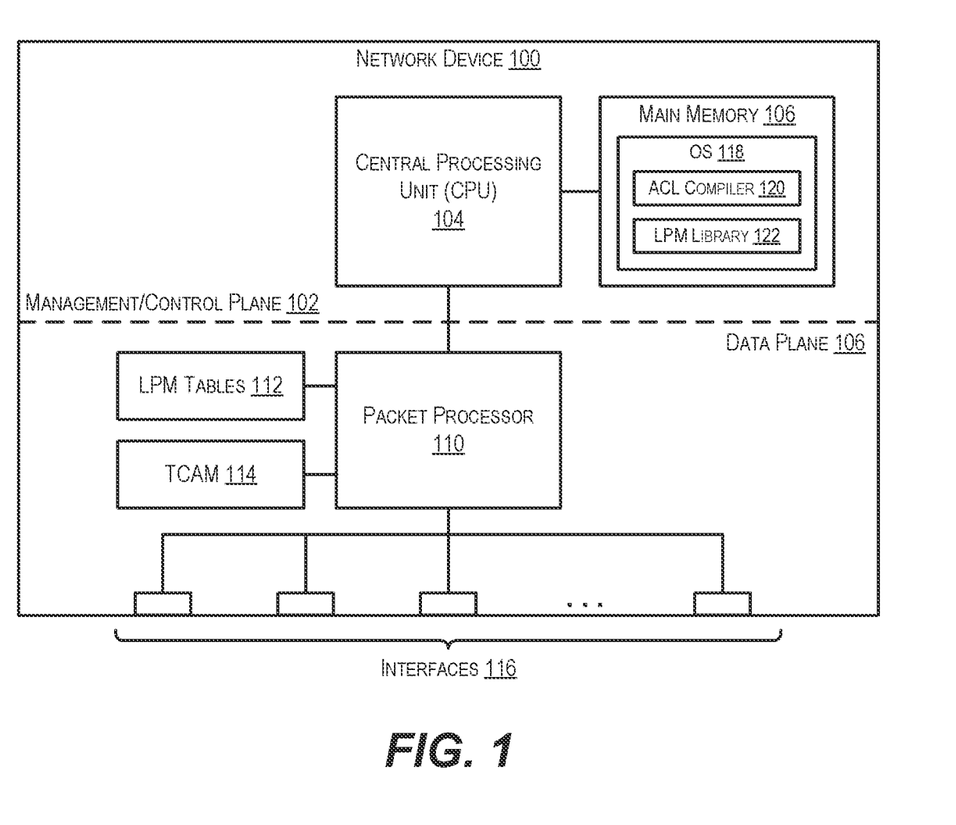
FIG. 1 depicts an example network device in accordance with certain embodiments of the present disclosure.

FIG. 1 is a simplified block diagram of a network device 100 (e.g., switch, router, etc.) in which the techniques of the present of the disclosure may be implemented. As shown, network device 100 includes a management/control plane 102 comprising a central processing unit (CPU) 104 and a main memory 106 and a data plane 108 comprising a packet processor 110, a set of one or more LPM tables 112, a TCAM 114, and a plurality of interfaces (i.e., ports) 116.

CPU 104 is generally responsible for managing the configuration/operation of network device 100 and controlling the device's understanding of the network in which it resides. CPU 104 carries out these functions under the direction of an operating system (OS) 118 that runs on CPU 102 from main memory 106.

Packet processor 110 is generally responsible for handling the processing and physical movement of network packets through network device 100 at line speed (i.e., the data throughput speed supported by the device), often based on determinations made by CPU 104. In modern network devices, packet processor 110 is typically an application-specific integrated circuit (ASIC) or field-programmable gate array (FPGA) with multiple processing cores, where each processing core handles the network traffic for a designated subset of interfaces 116. For example, if packet processor 110 has two processing cores C1 and C2 and network device 100 includes a total of sixteen interfaces 116(1)-(16), processing core C1 may be assigned to handle all network traffic passing through interfaces 116(1)-(8) and processing core C2 may be assigned to handle all network traffic passing through interfaces 116(9)-(16).

For the purposes of this disclosure, it is assumed that network device 100 enables users to define and apply access control lists (ACLs) to the interfaces of the device. An ACL is a list of rules that control the inbound and/or outbound flow of network packets at an interface, where each rule comprises a set of criteria and an associated action. The set of criteria specifies fields (e.g., source IP address, destination IP address, source port, destination port, protocol, etc.) and corresponding values that indicate which network packets are subject to, or in other words match, the rule. For instance, a criterion that pertains to the source IP address or destination IP address field will typically specify an IP prefix (or a base IP address and subnet mask) indicating the range of IP addresses that results in a match. The action indicates how the network device's data plane should handle network packets that match the rule in accordance with its criteria. The two most common ACL actions are "permit" (which means that a matched packet will be allowed to pass through the network device) and "deny" (which means that a matched packet will be dropped/blocked).

By way of example, the following is a sample ACL comprising two rules:
  permit ip 192.168.1.0 0.0.0.255 any
    deny ip any 10.0.0.0 0.0.255.255

Listing 1

The first rule in this ACL states that IP network traffic with a source IP address falling within the range 192.168.1.0 to 192.168.1.255 (as represented by the base IP address 192.168.1.0 and subnet mask 0.0.0.255, which is equivalent to IP prefix 192.168.1.0/24) should be permitted. There is no condition placed on the destination IP address per the keyword "any" following the source IP address criterion. The second rule states that IP network traffic with a destination IP address falling within the range 10.0.0.0 to 10.0.255.255 (as represented by the base IP address 10.0.0.0 and subnet mask 0.0.255.255, which is equivalent to IP prefix 10.0.0.0/16) should be denied. There is no condition placed on the source IP address per the keyword "any" preceding the destination IP address criterion.

Traditionally, the ACLs that are defined for a network device are applied to the device's interfaces (and thus allowed to control traffic flowing through those interfaces) by being programmed into a TCAM residing in the device's data plane. A TCAM is a type of high-speed memory that enables fast, parallel searching of its contents. For example, according to this traditional approach, the ACLs defined for network device 100 may be programmed into TCAM 114 of data plane 108.

This programming results in the creation of TCAM entries in the TCAM that correspond to the ACL rules. For instance, programming the first rule of the sample ACL above into TCAM 114 of network device 100 will create a TCAM entry with a key field specifying the IP prefix 192.168.1.0/24 for source IP address and an action field specifying the "permit" action. Further, programming the second rule of the sample ACL into TCAM 114 will create a TCAM entry with a key field specifying the IP prefix 10.0.0.0/16 for destination IP address and an action field specifying the "deny" action. With these TCAM entries in place, upon receiving a network packet to be processed, packet processor 110 will perform a lookup into TCAM 114 in order to determine whether the network packet matches the criteria of any of the TCAM entries. If a match is found, packet processor 110 will retrieve the action specified in the matched TCAM entry and execute the action on the packet.

One problem with the foregoing traditional approach is that network device TCAMs are often small in size due to their high cost. For example, even in high-end switches and routers that are intended for use in large-scale deployments, TCAM size is limited to a few hundred megabytes (MB) at most. This means that, in many cases, the TCAM of a network device will be too small to accommodate all of the ACL rules defined for the device.

To mitigate this problem, network device 100 of FIG. 1 employs, via an ACL compiler 120 and an LPM library 122 that is part of (or runs on top of) OS 118, a prefix summarization feature that leverages the device's LPM tables 112 for implementing ACLs. LPM tables 112 are a set of hierarchical memory tables that are less expensive (and thus larger in capacity) than TCAM 114 and are configured to (1) store mappings between IP prefixes and target values (e.g., routes, labels, etc.) and (2) enable LPM searching on those prefixes. For instance, upon receiving an input IP address, LPM tables 112 will find the longest matching IP prefix stored in the tables and return its corresponding target value.

At a high level, prefix summarization enables network device 100 to map, via LPM tables 112, various disjoint sets of IP prefixes defined in the device's ACL rules to common labels. This in turn reduces the number of TCAM entries needed in TCAM 114 to implement those ACL rules. As a simple example, assume a user defines an ACL comprising one thousand rules for network device 100, where each rule specifies a source IP address criterion with a different IP prefix and an associated action of "permit." In this scenario, network device 100 can program prefix-to-label mappings into LPM tables 112 that map the IP prefixes of those one thousand rules to a common label L, and program a single TCAM entry in TCAM 114 that identifies label L in the key field and the action "permit" in the action field. Packet processor 110 can then perform a two-stage lookup on incoming network traffic to apply the ACL, where the first stage involves performing a first lookup into LPM tables 112 to retrieve label L for a matched packet and the second stage involves performing a second lookup into TCAM 114 to retrieve the "permit" action for label L. This approach is significantly more efficient in terms of TCAM usage than the traditional approach above, which would require the programming of one thousand separate TCAM entries in TCAM 114 (i.e., one TCAM entry for each rule in the ACL).

Figure 2:
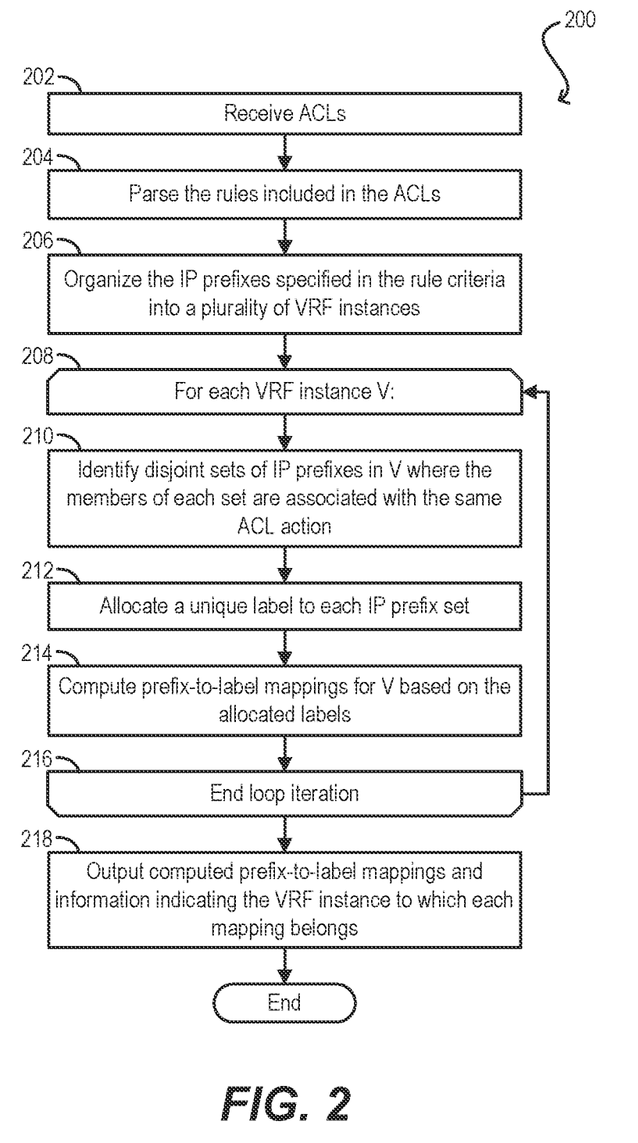
FIG. 2 depicts a workflow for computing prefix-to-label mappings in accordance with certain embodiments of the present disclosure.
Figure 3:
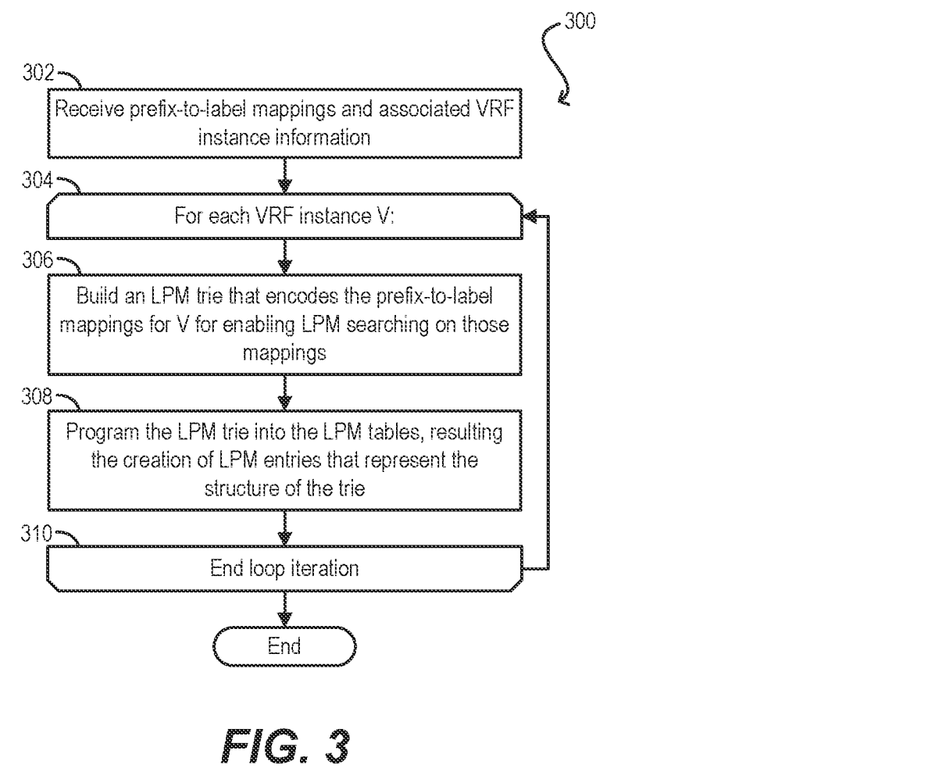
FIG. 3 depicts a workflow for programming prefix-to-label mappings into a set of LPM tables in accordance with certain embodiments of the present disclosure.

To provide additional clarity regarding how network device 100 uses prefix summarization to implement ACLs, FIG. 2 depicts a workflow 200 performed by the device's CPU 104 via ACL compiler 120 for computing prefix-to-label mappings that are derived from the ACL rules defined for network device 100. Further, FIG. 3 depicts a workflow 300 performed by CPU 104 via LPM library 122 for programming the computed prefix-to-label mappings into LPM tables 112, resulting in the creation of corresponding LPM entries in those tables.

Starting with step 202 of workflow 200, ACL compiler 120 receives one or more ACLs defined for network device 100. For example, these ACLs may be defined by a human user/administrator of the device or by an automated agent.

At steps 204 and 206, ACL compiler 120 parses the rules included in the one or more ACLs and organizes the IP prefixes specified in the rule criteria into a plurality of VRF instances. A VRF instance in this context is a logically distinct grouping of IP prefixes that is classified along a number of different dimensions relevant to network device 100. For example, in one set of embodiments the VRF instances of network device 100 may be classified along the following three dimensions: (1) source or destination address, (2) processing core, and (3) ACL version.

Dimension (1) indicates whether the IP prefixes in the VRF instance pertain to the source IP address field or the destination address field in their corresponding ACL rule criteria. There are two possible values in this dimension—one for source and one for destination.

Dimension (2) indicates the processing core of packet processor 110 that the IP prefixes in the VRF instance are assigned to for handling purposes. As mentioned previously, each processing core of packet processor 110 is typically assigned to a subset of interfaces 116(*l*)-(*n*). Accordingly, the IP prefix from an ACL rule that is applied to an interface 116(*i*) will be part of a VRF instance where the value of this processing core dimension identifies the processing core assigned to handle interface 106(*i*). The number of possible values in this dimension will be equal to the number of processing cores in packet processor 110.

Dimension (3) indicates the version of the ACL(s) from which the IP prefixes in the VRF instance are derived from. In the case where network device 100 supports hitless (i.e., atomic) ACL upgrades, there will typically be two possible values in this dimension: an "old" version and a "new" version. This is because the hitless upgrade process involves swapping from an old/prior set of ACLs to a new/current set of ACLs, and there will be a window of time where both versions are present on the network device to enable the hitless switchover.

Assuming two possible values for dimension (1) (e.g., source and destination), two possible values for dimension (2) (e.g., processing core C1 and processing core C2), and two possible values for dimension (3) (e.g., old version and new version), ACL compiler 120 will organize the IP prefixes into $2^3$=8 different VRF instances at step 206.

At steps 208 and 210, ACL compiler 120 enters a loop for each VRF instance V and, within this loop, identifies non-overlapping (i.e., disjoint) sets of IP prefixes in VRF instance V where the members of each set are associated with the same ACL action. ACL compiler 120 further allocates a unique label to each IP prefix set (step 212) and computes prefix-to-label mappings for VRF instance V based on the allocated labels (step 214). For example, assume ACL compiler 120 identifies two disjoint sets of IP prefixes S1 and S2 in VRF instance V where set S1 includes prefixes P1, P2, and P3 and set S2 includes prefixes P4 and P5. Further assume that ACL compiler 120 allocates label L1 to set S1 and label L2 to set S2. In this scenario, the compiler will compute the following prefix-to-label mappings for VRF instance V at step 214: P1→L1, P2→L1, P3→L1, P4→L2, and P5→L2.

At step 216, ACL compiler 120 reaches the end of the current loop iteration and returns to step 208 in order to process the next VRF instance. Once all VRF instances have been processed, ACL compiler 120 outputs the computed prefix-to-label mappings, along with information indicating the VRF instance to which each mapping belongs (step 218) and workflow 200 ends.

Turning now to workflow 300, at step 302, LPM library 122 running on CPU 104 receives the prefix-to-label mappings and associated VRF instance information output by ACL compiler 120. LPM library 122 then enters a loop for each VRF instance V (step 304) and, within this loop, builds a trie data structure (referred to as an LPM trie) that encodes the prefix-to-label mappings associated with VRF instance V, thereby enabling LPM searching based on those mappings (step 306). An LPM trie is a tree-like data structure where each node of the trie corresponds to an IP prefix in binary format; in particular, the root node corresponds to the empty prefix and each level down in the trie adds another bit to the prefix. Further, an LPM trie is structured such that, in order to find the longest IP prefix in the trie matching a given IP address, the search algorithm traverses the trie from the root node, following the path dictated by each bit in the IP address (starting from the most significant bit). The search stops when it either reaches a leaf node or can no longer continue because the next bit of the IP address does not have a corresponding child node in the trie. The algorithm then returns the data associated with the last node it visited, which represents the longest prefix match.

Figure 4:
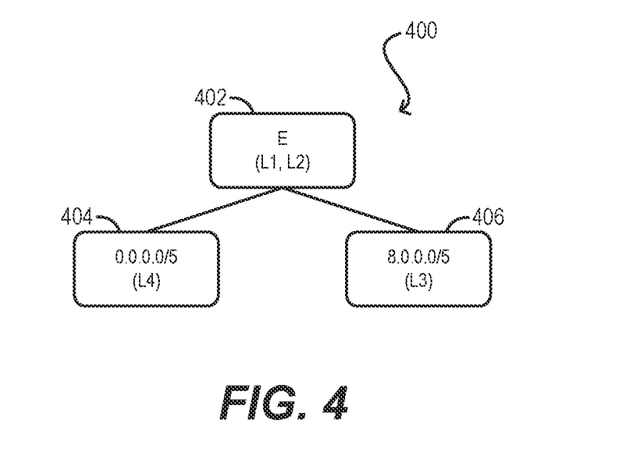
FIG. 4 depicts an example LPM trie in accordance with certain embodiments of the present disclosure.

By way of example, assume that the prefix-to-label mapping list for VRF instance V includes the following four mappings: (1) 128.0.0.0/1 (binary representation: 10000000 00000000 00000000 00000000 to 11111111 11111111 11111111 1111111)→label L1, (2) 0.0.0.0/1 (binary representation: 00000000 00000000 00000000 00000000 to 01111111 11111111 11111111 11111111)→label L2, (3) 9.0.0.0/8 (binary representation: 00001001 00000000 00000000 00000000 to 00001001 11111111 11111111 11111111)→label L3, and (4) 4.0.0.0/8 (binary representation: 00000100 00000000 00000000 00000000 to 00000100 11111111 11111111 11111111)→label L4. In this scenario, LPM library 122 will build the LPM trie shown in FIG. 4 (reference numeral 400). It is assumed that each node of LPM trie 400 covers five bits of prefix length. The structure of LPM trie 400 aligns with these four mappings as follows:

Root node 402 corresponds to the empty prefix ("E") and splits into two child nodes: a first child node 404 corresponding to the IP prefix 0.0.0.0/5 and a second child node 406 corresponding to the IP prefix 8.0.0.0/5.

Root node 402 is associated with labels L1 and L2 because the IP prefixes mapped to these two labels are not covered by any of the child nodes.

First child node 404 is associated with label L4 because the IP prefix mapped to L4 (i.e., 4.0.0.0/8) falls within the range of IP addresses covered by this node.

Second child node 406 is associated with label L3 because the IP prefix mapped to L3 (i.e., 9.0.0.0/8) falls within the range of IP addresses covered by this node.

Returning to workflow 300, upon building the LPM trie at step 306, LPM library 122 programs the trie into LPM tables 112, resulting in the creation of LPM entries in the LPM tables that represent the structure of the trie (step 308). Generally speaking, this programming step involves traversing the LPM trie on a per-node basis starting from the root node and programing LPM entries into LPM tables 112 that are representative of the information held at each node (e.g., IP prefix and label).

Finally, LPM library 122 reaches the end of the current loop iteration at step 310. LPM library 122 thereafter repeats steps 304-310 until it has processed all VRF instances. Although not shown in these figures, a separate component of OS 118 can populate TCAM 114 with appropriate TCAM entries mapping the labels allocated by ACL compiler 120 to the ACL actions associated with those labels.

2. Solution Overview

While prefix summarization is effective in reducing TCAM usage for ACLs as described above, the use of this feature can also result in a large number of duplicate LPM entries in LPM tables 112, particularly across different VRF instances. For example, assume that ACL compiler 120 organizes the IP prefixes derived from the ACLs of network device 100 into VRF instances according to the three dimensions mentioned previously: source/destination, processing core, and ACL version. In this scenario, the following ACL use cases will result in a significant degree of LPM entry duplication:

A use case where ACLs are applied to bi-directional traffic; this will cause the IP prefix sets in the VRF instances corresponding to source and destination respectively to be largely identical due to the application of the same ACL rules on forward and reverse traffic.

A use case where the same ACLs are applied to all interfaces of the network device; this will cause the IP prefix sets in the VRF instances corresponding to different processing cores to be largely identical because all of the processing cores will apply the same ACL rules to their assigned interfaces.

A use case where a hitless upgrade process is used to upgrade the ACLs applied on the network device from an old version to a new version, and where the amount of changes between the old and new versions is small; this will cause the IP prefix sets in the VRF instances corresponding to the old and new versions respectively to be largely identical because of the high degree of similarity between those two versions.

Each of the factors above can cut the prefix summarization scale of LPM tables 112 in half (or more) due to duplicate LPM entries. This is problematic because, although LPM tables 112 are larger in size than TCAM 114, the capacity of LPM tables 112 is still fixed. Accordingly, this fixed capacity imposes a limit on the number of ACL rules that can be implemented on network device 100. Further, in some network devices LPM tables 112 may be used for additional functions beyond ACLs, such as IP routing. These additional functions make it even more important to optimize the usage of LPM tables 112 because of the need to split the available capacity of the tables across the various functions.

Figure 5:
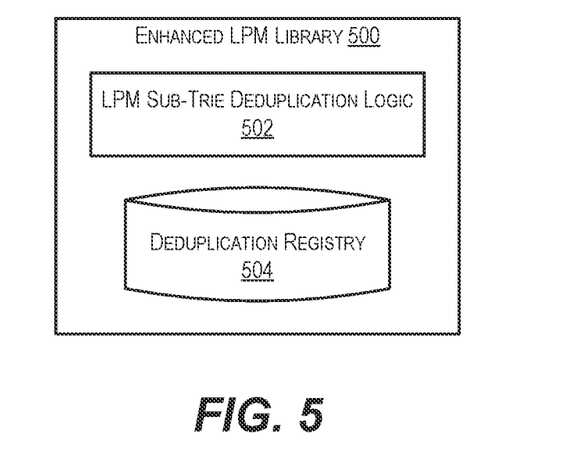
FIG. 5 depicts another example network device in accordance with certain embodiments of the present disclosure.

To address the foregoing and other related issues, FIG. 5 depicts an enhanced version 500 of LPM library 122 of FIG. 1 according to certain embodiments. As shown, enhanced LPM library 500 includes a new LPM sub-trie deduplication logic component 502 and a new deduplication registry 504.

As explained in further detail in section (3) below, components 502 and 504 enable enhanced LPM library 500 to determine, at the time of programming an LPM trie for a given VRF instance into LPM tables 112, whether any sub-tries of the LPM trie were previously programmed into LPM tables 112 with respect to another VRF instance. If the answer is no, enhanced LPM library 500 can program the LPM trie as normal per step 308 of FIG. 3. However, if the answer is yes (i.e., enhanced LPM library 500 identifies one or more sub-tries that were previously programmed), the library can conclude that the identified sub-tries are duplicative and thus refrain from creating new LPM entries in LPM tables 112 for them. Instead, enhanced LPM library 500 can re-use the existing LPM entries representative of those sub-tries in LPM tables 112 for the current LPM trie.

By deduplicating sub-tries as part of the LPM trie programming process, enhanced LPM library 500 can advantageously reduce or eliminate duplicate LPM entries in LPM tables 112 corresponding to different VRF instances (e.g., VRF instances for source and destination, VRF instances for processing core C1 and processing core C2, etc.). Accordingly, enhanced LPM library 500 can significantly improve the prefix summarization scale of LPM tables 112, particularly for ACL use cases where LPM entry duplication across VRF instances is common.

It should be appreciated that FIGS. 1-5 and the foregoing description are illustrative not intended to limit embodiments of the present disclosure. For example, although FIG. 1 depicts a particular arrangement of components in network device 100, other arrangements are possible (e.g., the functionality attributed to a particular component may be split into multiple components, components may be combined, etc.). Further, although the foregoing description assumes that LPM tables 112 are programmed with LPM entries pertaining to ACL rules, the LPM deduplication techniques of the present disclosure are not limited to this specific context. For example, these techniques may be applied to contexts where the entries of LPM table 112 are used for implementing other functions such as IP routing, Quality of Service (QoS) policies, and so on.

3. LPM Library Workflow with Sub-Trie Deduplication

Figure 6:
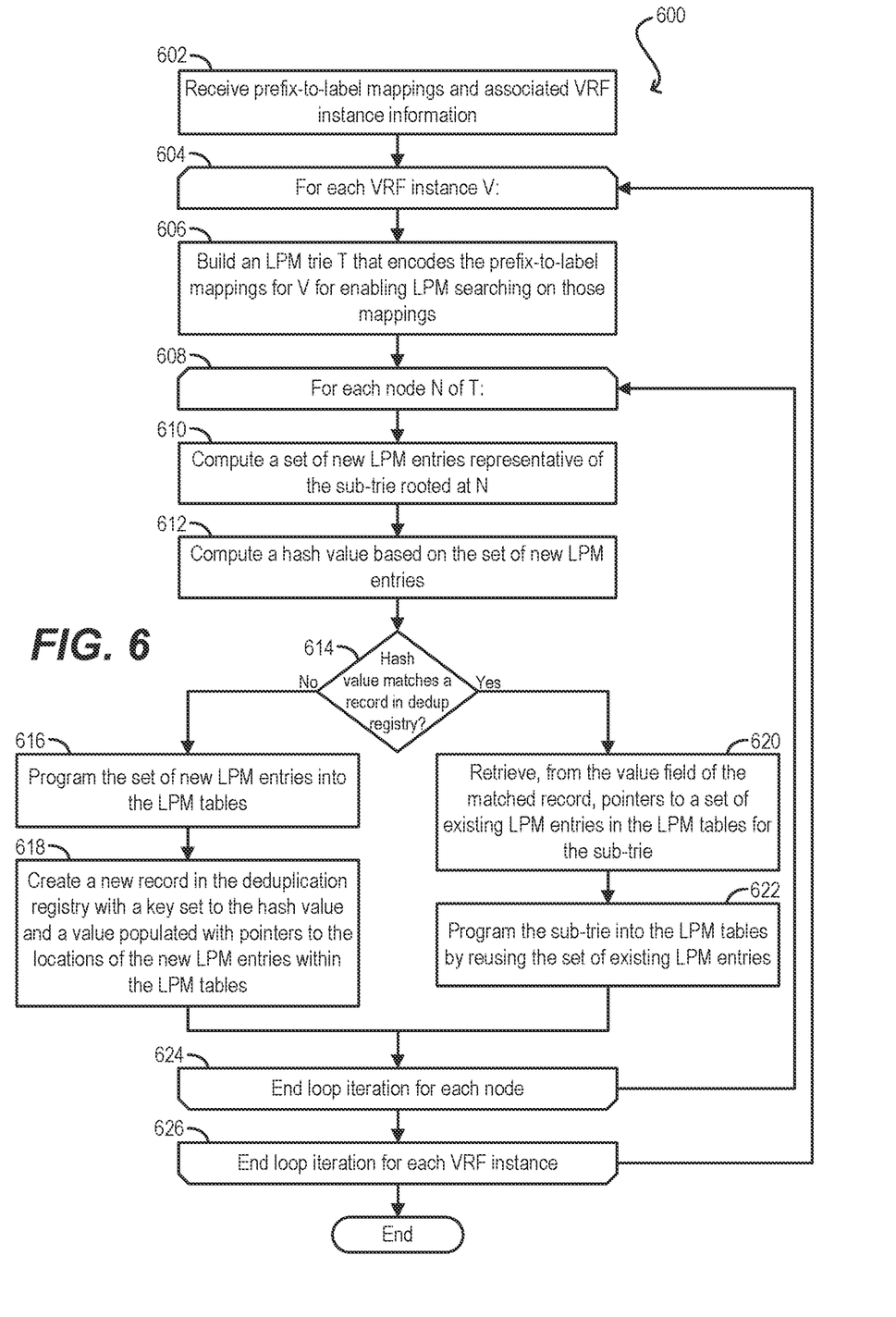
FIG. 6 depicts a workflow for programming prefix-to-label mappings into a set of LPM tables with LPM sub-trie deduplication in accordance with certain embodiments of the present disclosure

FIG. 6 depicts a workflow 600 that may be performed by enhanced LPM library 500 for programming prefix-to-label mappings into LPM tables 112 of network device 100 according to certain embodiments. Workflow 600 covers the same general process as workflow 300 of FIG. 3 but includes additional steps for deduplicating LPM sub-tries as part of this process in accordance with the library's LPM sub-trie deduplication logic component 502.

Starting with steps 602 and 604, enhanced LPM library 500 can receive the prefix-to-label mappings and associated VRF instance information output by ACL compiler 120 at step 218 of workflow 200 and can enter a first loop for each VRF instance V. Within this first loop, enhanced LPM library 500 can build an LPM trie T that encodes the prefix-to-label mappings associated with VRF instance V for enabling LPM searching on those mappings (step 606).

Upon building LPM trie T, enhanced LPM library 500 can enter a second loop for each node N in trie T (step 608). Within this second loop, enhanced LPM library 500 can compute a set of new LPM entries representative of the sub-trie rooted at node N (step 610). For example, this set of new LPM entries can encode the structure of the sub-trie, including the IP prefix (and associated label, if any) present at each sub-trie node. Enhanced LPM library 500 can further provide the new LPM entries as input to a hash function, resulting in a hash value for the LPM entries (step 612).

At step 614, enhanced LPM library 500 can check whether the hash value matches a record in deduplication registry 504. If the answer is no, enhanced LPM library 500 can conclude that the current sub-trie is not duplicative and thus can program the new LPM entries computed at step 610 into LPM tables 112 (step 616). Enhanced LPM library 500 can also create a new record in deduplication registry 504 with a key that is set to the hash value and a value that is populated with pointers to the locations of the new LPM entries within LPM tables 112 (step 618).

However, if the answer at step 614 is yes, enhanced LPM library 500 can conclude that the current sub-trie is a duplicate and can refrain from programming the new LPM entries computed at step 610. Instead, enhanced LPM library 500 can retrieve, from the value field of the matched registry record, pointers to a set of existing LPM entries in LPM tables 112 that were previously programmed into the tables for the current sub-trie in the context of a different VRF instance (step 620). Enhanced LPM library 500 can then program the sub-trie into LPM tables 112 by reusing the existing LPM entries (step 622). For example, in one set of embodiments, enhanced LPM library 500 can modify LPM tables 112 to point to the existing LPM entries (via the pointers retrieved at step 620) in the context of the current VRF instance. Although not shown, in some embodiments enhanced LPM library 500 can also access and increment a reference count variable associated with the existing LPM entries, thereby indicating that those LPM entries are now being referenced by an additional VRF instance.

Upon completing either step 618 or 622, enhanced LPM library 500 can reach the end of the current loop iteration of the second loop (step 624) and can return to step 608 to process additional nodes in LPM trie T. Further, upon processing all nodes in LPM trie T, enhanced LPM library 500 can reach the end of the current loop iteration of the first loop (step 626) and return to step 604 to process additional VRF instances. Finally, upon processing all VRF instances, workflow 600 can end.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments may have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

The invention claimed is:

1. A method performed by a network device comprising a set of longest prefix match (LPM) tables, the method comprising:
   receiving a plurality of prefix-to-label mappings, each prefix-to-label mapping being associated with a virtual routing and forwarding (VRF) instance in a plurality of VRF instances; and
   for each VRF instance in the plurality of VRF instances:
      building an LPM trie based on the prefix-to-label mappings associated with the VRF instance; and
      for each node in the LPM trie:
         computing one or more new LPM entries for a sub-trie of the LPM trie that is rooted at the node;
         computing a hash value based on the one or more new LPM entries;
         determining whether the hash value matches any record in a deduplication registry; and
         upon determining that the hash value matches a record in the deduplication registry:
            retrieving, from the matched record, information regarding one or more existing LPM entries previously programmed into the LPM tables for the sub-trie; and
            programming the sub-trie into the LPM component by reusing the one or more existing LPM entries via the retrieved information.

2. The method of claim 1 further comprising, upon determining that the hash values does not match any record in the deduplication registry:
   programming the one or more new LPM entries into the LPM tables; and
   creating a new record in the deduplication registry with a key comprising the hash value and a value comprising information regarding the one or more new LPM entries.

3. The method of claim 1 wherein the information regarding the one or more existing LPM entries includes one or more pointers to locations of the one or more existing LPM entries in the LPM tables.

4. The method of claim 1 wherein reusing the one or more existing LPM entries comprises:
   updating the LPM tables to point to the one or more existing LPM entries in a context of the VRF instance.

5. The method of claim 1 wherein the programming of the sub-trie does not include programming the one or more new LPM entries into the LPM tables.

6. The method of claim 1 wherein the plurality of prefix-to-label mappings are received from an access control list (ACL) compiler of the network device that is configured to perform prefix summarization with respect to a plurality of ACL rules.

7. The method of claim 1 wherein each VRF instance in the plurality of VRF instances is classified along a plurality of dimensions.

8. The method of claim 7 wherein the plurality of dimensions includes a dimension indicating whether Internet Protocol (IP) prefixes in the VRF instance pertain to a source IP address or a destination IP address of an ACL rule.

9. The method of claim 7 wherein the plurality of dimensions includes a dimension indicating whether IP prefixes in the VRF instance are derived from ACL rules handled by a first processing core or a second processing core of a packet processor of the network device.

10. The method of claim 7 wherein the plurality of dimensions includes a dimension indicating whether IP prefixes in the VRF instance are derived from a first version of an ACL or a second version of an ACL.

11. A network device comprising:
    a central processing unit (CPU);
    a packet processor;
    a plurality of interfaces;
    a set of longest prefix match (LPM) tables;
    a ternary content-addressable memory (TCAM); and
    a main memory having stored thereon program code that, when executed by the CPU, causes the CPU to:
       receive a plurality of prefix-to-label mappings, each prefix-to-label mapping being associated with a virtual routing and forwarding (VRF) instance in a plurality of VRF instances; and
       for each VRF instance in the plurality of VRF instances:
          build an LPM trie based on the prefix-to-label mappings associated with the VRF instance; and
          for each node in the LPM trie:
             compute one or more new LPM entries for a sub-trie of the LPM trie that is rooted at the node;
             compute a hash value based on the one or more new LPM entries;
             determine whether the hash value matches any record in a deduplication registry; and
             upon determining that the hash value matches a record in the deduplication registry:
                retrieve, from the matched record, information regarding one or more existing LPM entries previously programmed into the LPM tables for the sub-trie; and
                program the sub-trie into the LPM component by reusing the one or more existing LPM entries via the retrieved information.

12. The network device of claim 11 wherein the program code further causes the CPU to, upon determining that the hash values does not match any record in the deduplication registry:
    program the one or more new LPM entries into the LPM tables; and
    create a new record in the deduplication registry with a key comprising the hash value and a value comprising information regarding the one or more new LPM entries.

13. The network device of claim 11 wherein the information regarding the one or more existing LPM entries includes one or more pointers to locations of the one or more existing LPM entries in the LPM tables.

14. The network device of claim 11 wherein reusing the one or more existing LPM entries comprises:
    updating the LPM tables to point to the one or more existing LPM entries in a context of the VRF instance.

15. The network device of claim 11 wherein the programming of the sub-trie does not include programming the one or more new LPM entries into the LPM tables.

16. The network device of claim 11 wherein the plurality of prefix-to-label mappings are received from an access control list (ACL) compiler of the network device that is configured to perform prefix summarization with respect to a plurality of ACL rules.

17. The network device of claim 11 wherein each VRF instance in the plurality of VRF instances is classified along a plurality of dimensions.

18. A method performed by a network device comprising a set of longest prefix match (LPM) tables, the method comprising:
    receiving a plurality of prefix-to-label mappings, each prefix-to-label mapping being associated with a virtual routing and forwarding (VRF) instance in a plurality of VRF instances; and
    for each VRF instance in the plurality of VRF instances:
        building an LPM trie based on the prefix-to-label mappings associated with the VRF instance; and
        programming the LPM trie into the LPM tables, wherein the programming includes determining whether any sub-tries of the LPM trie were previously programmed into the LPM tables with respect to another VRF instance.

19. The method of claim 18 further comprising, upon determining that one or more sub-tries of the LPM trie were previously programmed into the LPM tables:
    reusing one or more existing LPM entries in the LPM tables for programming the one or more sub-tries.

20. The method of claim 18 wherein determining whether any sub-tries of the LPM trie were previously programmed into the LPM tables comprises:
    computing a hash value for each sub-trie of the LPM trie; and
    determining whether the hash value is found in a deduplication registry.

* * * * *